(12) United States Patent
Honma

(10) Patent No.: US 7,652,833 B2
(45) Date of Patent: Jan. 26, 2010

(54) CAMERA MODULE

(75) Inventor: Toshihiko Honma, Yamagata (JP)

(73) Assignee: Mitsumi Electric Co., Ltd. (JP)

( * ) Notice: Subject to any disclaimer, the term of this patent is extended or adjusted under 35 U.S.C. 154(b) by 0 days.

(21) Appl. No.: 12/021,155

(22) Filed: Jan. 28, 2008

(65) Prior Publication Data

US 2008/0186601 A1    Aug. 7, 2008

(30) Foreign Application Priority Data

Feb. 2, 2007  (JP) ............................. 2007-024540

(51) Int. Cl.
*G02B 7/02* (2006.01)
(52) U.S. Cl. ...................... 359/814; 359/694
(58) Field of Classification Search .................. 359/814
See application file for complete search history.

(56) References Cited

U.S. PATENT DOCUMENTS

| | | | | |
|---|---|---|---|---|
| 4,462,096 A | * | 7/1984 | Kusaka | ..................... 369/44.16 |
| 2005/0206486 A1 | * | 9/2005 | Yumita et al. | ............... 335/220 |
| 2006/0245085 A1 | * | 11/2006 | Lee et al. | .................... 359/813 |

OTHER PUBLICATIONS

U.S. Appl. No. 11/846,315, EP application No. 07115210.2-2209.
U.S. Appl. No. 11/846,442, EP application No. 07115201.1-2209.
U.S. Appl. No. 11/846,380, EP application No. 07115204.5-1240.
U.S. Appl. No. 11/853,629, EP application No. 07116090.7-1234.
U.S. Appl. No. 11/861,125, EP application No. 07117157.3-2217.
U.S. Appl. No. 11/928,127, EP application No. 07119515.0-2217.
U.S. Appl. No. 11/928,367, EP application No. 07119627.3-2217.
Camera Module, U.S. Appl. No. 11/683,956, filed Mar. 8, 2007, Toshihiko Honma.
Camera Module, U.S. Appl. No. 11/846,315, filed Aug. 28, 2007, Takashi Ishizawa Osaka Tomohiko.

(Continued)

*Primary Examiner*—Jordan M. Schwartz
*Assistant Examiner*—James C Jones
(74) *Attorney, Agent, or Firm*—Marger Johnson & McCollom, P.C.

(57) ABSTRACT

A camera module for small-sized electronic apparatuses such as digital cameras and cellular phones includes a lens unit; and a holder which houses the lens unit and is displaceable along an optical axis direction of the lens unit. A coil is provided on the holder of octagon shape in cross section having eight outside surface portions with a yoke having an outer cylindrical wall portion formed to have an octagon shape similar to the octagon shape of the coil and having eight magnet mounting inner surfaces. Eight flat plate-shaped magnets on the mounting surfaces for providing a magnetic field are arranged to face the outside surface portions of the coil through a predetermined constant spacing. Upper and lower leaf springs respectively support the holder so as to be displaceable along the optical axis direction of the lens unit; a base for supporting the yoke and the lower spring.

2 Claims, 4 Drawing Sheets

OTHER PUBLICATIONS

Camera Module, U.S. Appl. No. 11/846,442, filed Aug. 28, 2007, Takashi Ishizawa Osaka Tomohiko.
Camera Module, U.S. Appl. No. 11/846,380, filed Aug. 28, 2007, Takashi Ishizawa Osaka Tomohiko.
Camera Module, U.S. Appl. No. 11/853,629, filed Sep. 11, 2007, Takashi Ishizawa Osaka Tomohiko.
Camera Module, U.S. Appl. No. 11/861,125, filed Sep. 25, 2007, Takashi Ishizawa Osaka Tomohiko.
Camera Module, U.S. Appl. No. 11/928,127, filed Oct. 30, 2007, Takashi Ishizawa Osaka Tomohiko.
Camera Module, U.S. Appl. No. 11/928,367, filed Oct. 30, 2007, Takashi Ishizawa Osaka Tomohiko.
Camera Module, U.S. Appl. No. 12/017,546, filed Jan. 22, 2008, Toshihiko Honma Masayuki Itagaki.
Camera Module, U.S. Appl. No. 12/021,155, filed Jan. 28, 2008, Toshihiko Honma.

* cited by examiner

CAMERA MODULE

BACKGROUND OF THE INVENTION

1. Field of the Invention

This invention relates to a camera module, and more specifically to a camera module that can be used in small-sized electronic apparatuses such as digital cameras, camera-equipped cellular phones and the like.

2. Description of the Prior Art

A camera module having a function of displacing a lens unit in a direction of an optical axis of the lens unit is used in relatively small-sized digital cameras, camera-equipped cellular phones and the like. This function is used for providing an autofocus function and/or zoom function, and is achieved by an interaction between a magnetic field generated by an electrical current flowing in a coil and a magnetic field generated by a yoke and magnets provided on the yoke. Recently, camera modules to be mounted in camera-equipped cellular phones are required to further reduce size and shape thereof.

FIG. 4 shows an actuator assembly for providing an autofocus function used in a conventional camera module. The actuator assembly 100 includes a holder 103 which houses a lens unit (not shown in the drawing), a coil 101 wound around the holder 103, a base 104 formed into a roughly square shape having four corner posts near the four corner thereof, four magnets 102 respectively arranged near the four corner posts of the base 104, and a spring 105 for resiliently supporting the holder 103.

In the actuator assembly 100, by supplying an electrical current to the coil 101 provided on the holder 103, a repellent force is generated by the magnetic fields provided by the four magnets 102 and the coil 101. Further, by utilizing a spring force of the spring 105, the holder 103 can be displaced up and down directions in the figure to carry out the autofocus function.

One example of a camera module having such an actuator assembly 100 is disclosed in a publication of Japanese Utility Model Registration No. 3124292.

In the actuator assembly 100 described above, the four magnets 102 are arranged on the corners of the roughly square-shaped base 104. Therefore, when the entire size of the camera is to be reduced, there is a problem in that sufficient magnetic force cannot be secured in each of the magnets 102. This is because if the thickness of each magnet 102 is reduced, the distance between the N pole and the S pole in each magnet is shortened, thus resulting in a reduced magnetic force.

Further, in the actuator assembly 100 described above, the reduced magnetic force due to the reduced size of each magnet is compensated by the provision of the spring 105. However, if the entire size of the camera module is to be further reduced, there arises another problem in that it becomes difficult to secure a space for providing the spring 105.

SUMMARY OF THE INVENTION

The present invention has been made in view of the problems described above, and therefore it is an object of the present invention to provide a camera module that can provide a sufficient driving force of a holder even in the case where the entire size of the camera module is reduced.

In order to achieve the object, the present invention is directed to a camera module, which comprises:

a lens unit which constitutes an optical system of the camera module;

a holder which houses the lens unit therein and is displaceable along an optical axis direction of the lens unit, the holder having a cylindrical shape having upper and lower cylindrical end portions;

a coil provided on the holder, the coil being formed to have an octagon shape in its horizontal cross section having eight outside surface portions;

a yoke having an outer wall portion formed to have an octagon shape in its horizontal cross section which is similar to and larger than the octagon shape of the coil and having eight magnet mounting inner surfaces, the yoke having a top surface portion formed with an opening for receiving the holder, eight flat plate-shaped magnets respectively provided on the magnet mounting inner surfaces of the outer wall portion of the yoke for providing a magnetic field to the coil, each of the eight flat plate-shaped magnets being arranged so as to face each of the outside surface portions of the coil through a predetermined spacing;

upper and lower leaf springs respectively attached to upper and lower cylindrical end portions of the holder for supporting the holder so as to be displaceable along the optical axis direction of the lens unit; and a base for supporting the yoke and the lower spring.

According to the camera module of the present invention provided with the actuator assembly having the structure described above, the eight flat plate-shaped magnets are arranged so as to surround the entire outer circumference of the coil through a predetermined constant spacing. Therefore, it is possible to provide a sufficiently strong magnetic field to the coil. As a result, it is possible to displace the holder with sufficient driving force.

Further, in the conventional camera module using a cylindrical coil in combination with flat plate-shaped magnets, there is a problem in that a distance between the circumferential surface of the coil and the surface of each magnet varies depending on positions of the circumferential surface of the coil. However, according to the camera module provided with the actuator assembly having the structure described above, the distance between the outside surface portions of the coil and the magnets can be kept constant.

In the camera module of the present invention, it is preferred that the eight outside surface portions of the coil include four small outside surface portions and four large outside surface portions which are arranged alternately, the eight magnet mounting inner surfaces of the outer wall portion of the yoke include four small inner surfaces and four large inner surfaces which are arranged alternately, and the eight flat plate-shaped magnets include four flat plate-shaped small magnets and four flat plate-shaped large magnets which are arranged alternately and respectively mounted on the corresponding magnet mounting inner surfaces of the outer wall portion of the yoke so as to have a predetermined spacing with respect to the corresponding outside surface portions of the coil. In this actuator assembly, it is also preferred that the coil is provided on the holder so that four spaces are created between the coil and the holder at the locations of the four small outside surface portions of the coil, and the yoke has four yoke pieces which are provided on the inner periphery of the top surface portion of the yoke which defines the opening so as to downwardly protrude into the four spaces, respectively, wherein the four yoke pieces are arranged inside the four spaces so as to face the four flat plate-shape small magnets through the four small outside surface portions of the coil, respectively.

According to the camera module provided with the actuator assembly having the structure described above, the four yoke pieces are provided on the inner periphery of the top surface portion of the yoke which defines the opening so as to protrude downwardly into the spaces between the holder and the coil, respectively, and the four yoke pieces are arranged inside the coil at positions respectively corresponding to the four plate-shaped small magnets. As a result, since the coil is placed in a strong magnetic field produced between each of the four plate-shaped small magnets and each of the four yoke pieces at the locations of the four yoke pieces, it is possible to further enhance the driving force of the holder. Further, since the four yoke pieces are positioned in the spaces created between the outer circumferential surface of the holder and the coil, the inside space of the actuator assembly can be used effectively, which contributes to a further reduction in size of the camera module.

The above and other objects, features and advantages of the present invention will be apparent from the following description when taken in conjunction with the accompanying drawings which illustrates a preferred embodiment of the present invention by way of an example.

DETAILED DESCRIPTION OF THE PREFERRED EMBODIMENTS

Figure 1:
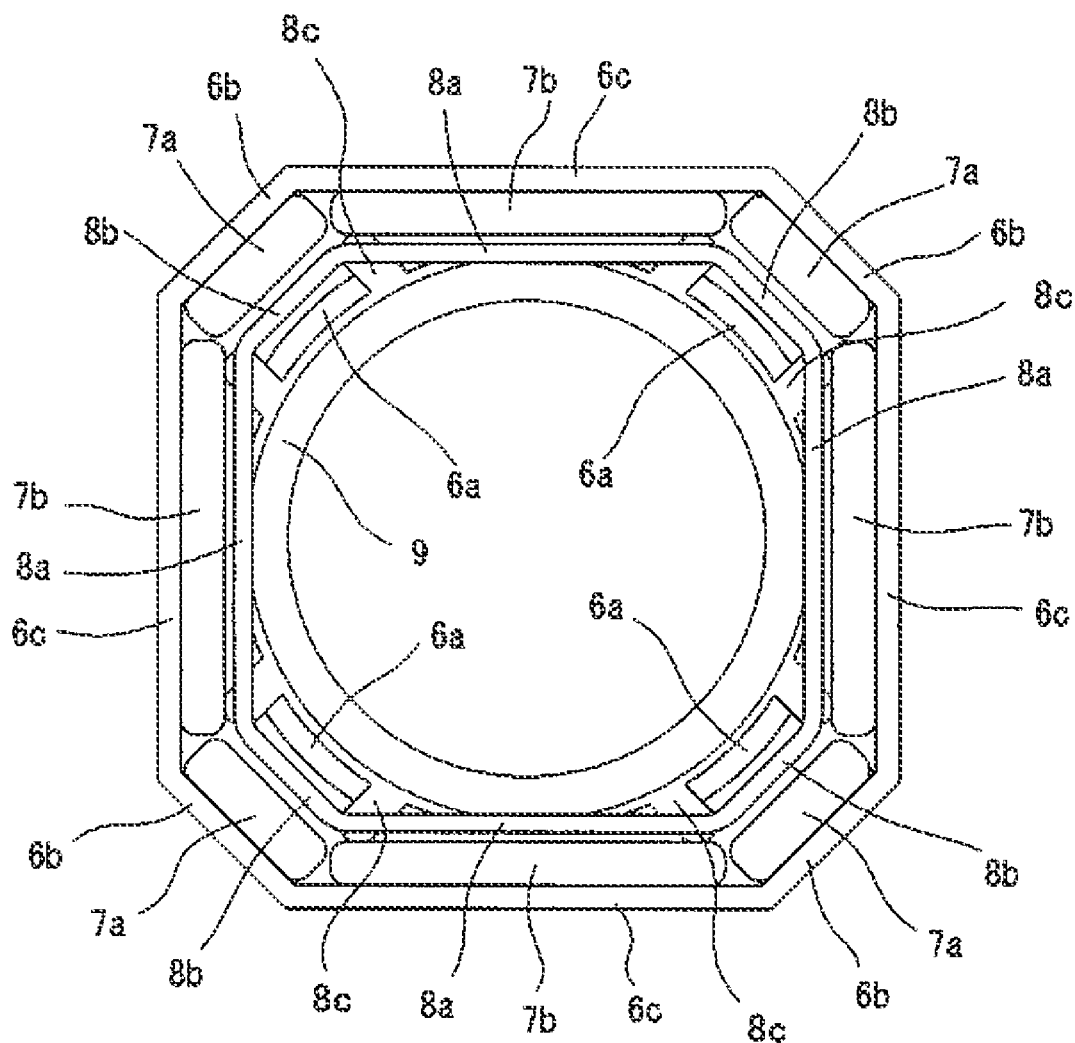
FIG. 1 is a top plan view which shows arrangement of a yoke 6, magnets 7 (7a, 7b) and a coil 8 which constitute an actuator assembly 1 used in a camera module of an embodiment according to the present invention.

A camera module according to an embodiment of the present invention will be described below with reference to the accompanying drawings.

An actuator assembly 1 of a camera module according to the embodiment includes: a lens unit which constitutes an optical system of the camera module (not shown in the drawings); a holder 9 which houses the lens unit therein and is displaceable along the optical axis direction of the lens unit, the holder 9 having a roughly cylindrical shape having upper and lower cylindrical end portions; a coil 8 provided on the holder and formed to have an octagon shape in its horizontal cross section having eight outside surface portions; a yoke 6 having an outer wall portion formed to have an octagon shape in its horizontal cross section which is similar to and larger than the octagon shape of the coil 8 and having eight magnet mounting inner surfaces; eight flat plate-shaped magnets 7 (7a, 7b) respectively provided on the magnet mounting inner surfaces of the yoke 6 for providing a magnetic field to the coil 8 in cooperation with the yoke 6, each of the eight flat plate-shaped magnets 7a, 7b being arranged so as to face each of the outside surface portions of the coil 8 through a predetermined spacing; upper and lower leaf springs 5, 11 respectively attached to the upper and lower cylindrical end portions of the holder for supporting the holder so as to be displaceable along the optical axis direction of the lens unit; and a base 12 for supporting the yoke 6 and the lower spring 11.

Hereinbelow, with reference to FIG. 3, a detailed description will be made with regard to the actuator assemble 1 of the camera module of the embodiment. In this regard, it is to be noted that an imaging element (not shown in the drawing) is provided below the base 12.

The holder 9 that houses a barrel (not shown) holding the lens unit therein is provided in a space defined between a cover 2 and the base 12 so that the holder 9 is displaceable in the direction of the optical axis of the lens unit.

An inner annular portion 5b of the upper leaf spring 5 is attached to the upper cylindrical end portion of the holder 9, and an outer annular portion 5a of the upper leaf spring 5 is attached to a top surface portion 6d of the yoke 6. An inner annular portion 11b of the lower leaf spring 11 is attached to the lower cylindrical end portion of the holder 9, and an outer annular portion 11a of the lower leaf spring 11 is supported on the base 12 through a second plate 3. The inner annular portion 5b of the upper leaf spring 5 is coupled to the outer annular portion 5a through bridge portions 5c so that the inner annular portion 5b can be resiliently deformed with respect to the outer annular portion 5a. As is the same with the upper leaf spring 5, the inner annular portion 11b of the lower leaf spring 11 is coupled to the outer annular portion 11a through bridge portions 11c so that the inner annular portion 11b can be resiliently deformed with respect to the outer annular portion 11a.

The yoke 6 and the magnets 7a, 7b produce a magnetic field. Further, the coil 8 is disposed in the magnetic field produced by the magnets 7a, 7b and the yoke 6. The coil 8 is attached to coil support portions 9a of the holder 9 which are provided on the outer periphery of the lower cylindrical end portion of the holder 9. The yoke 6 has an opening 6e for receiving the holder 9 in the center of the top surface portion 6d thereof. The holder 9 can be displaced through the opening 6e of the yoke 6 in a direction of the optical axis of the lens unit by supplying a current to the coil 8.

Figure 3:
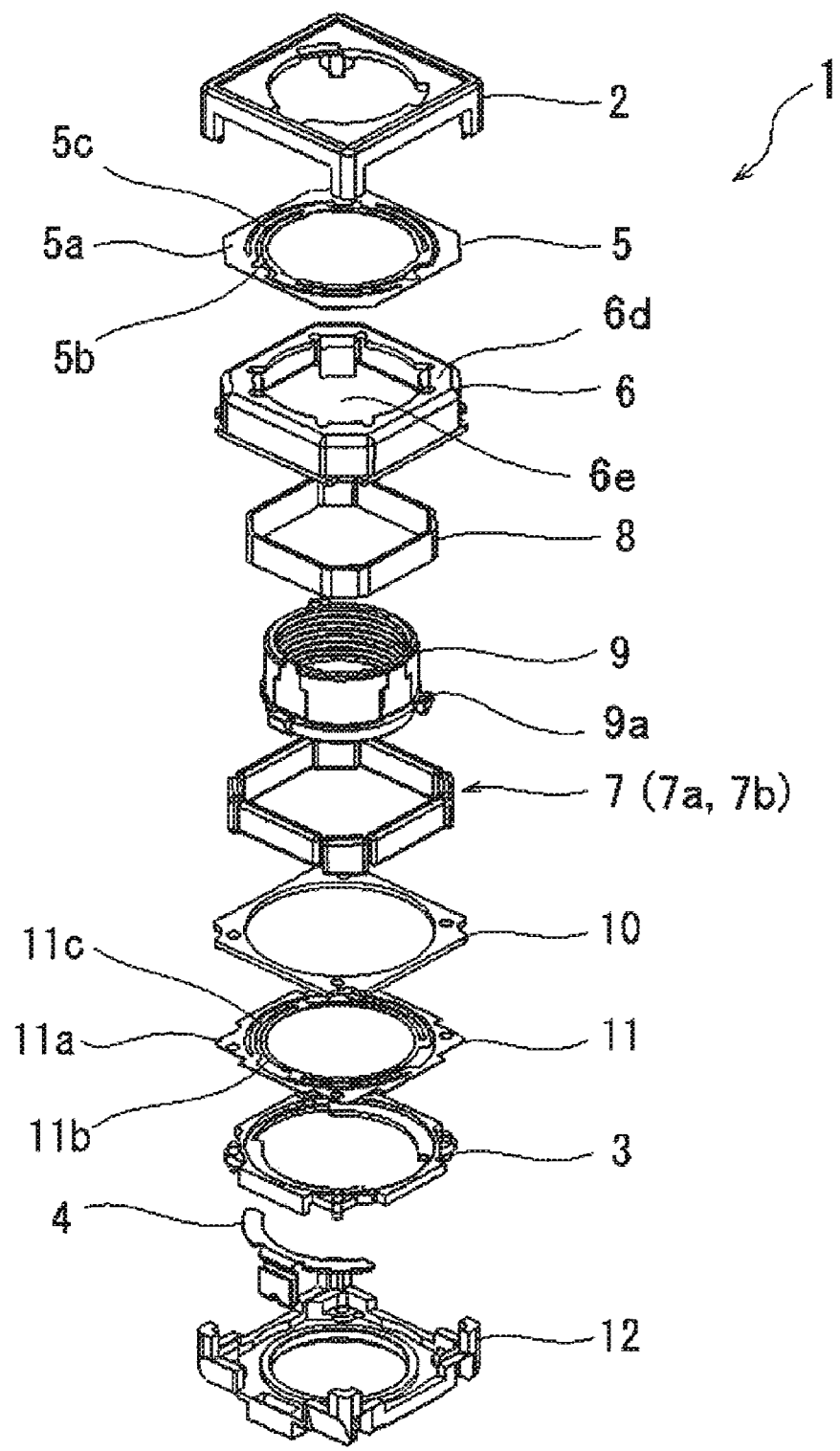
FIG. 3 is an exploded perspective view of the actuator assembly 1 used in the camera module of the embodiment according to the present invention.
Figure 4:
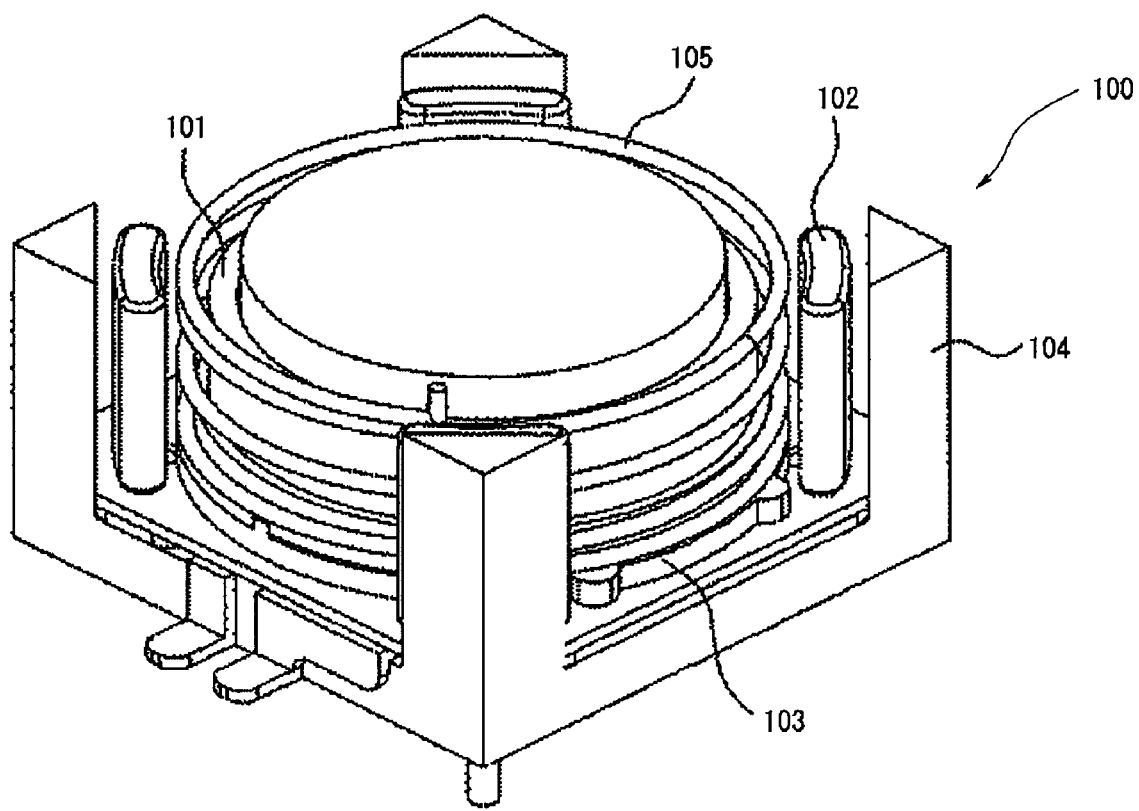
FIG. 4 is a perspective view which shows an actuator assembly 100 used in a conventional camera module.

In FIG. 3, it is noted that a component denoted by the reference numeral 4 is a flexible printed circuit board for supplying a current to the coil 8, and a component denoted by the reference numeral 10 is a thin metal plate provided between the lower leaf spring 11 and the bottom end portion of the yoke 6.

Figure 2:
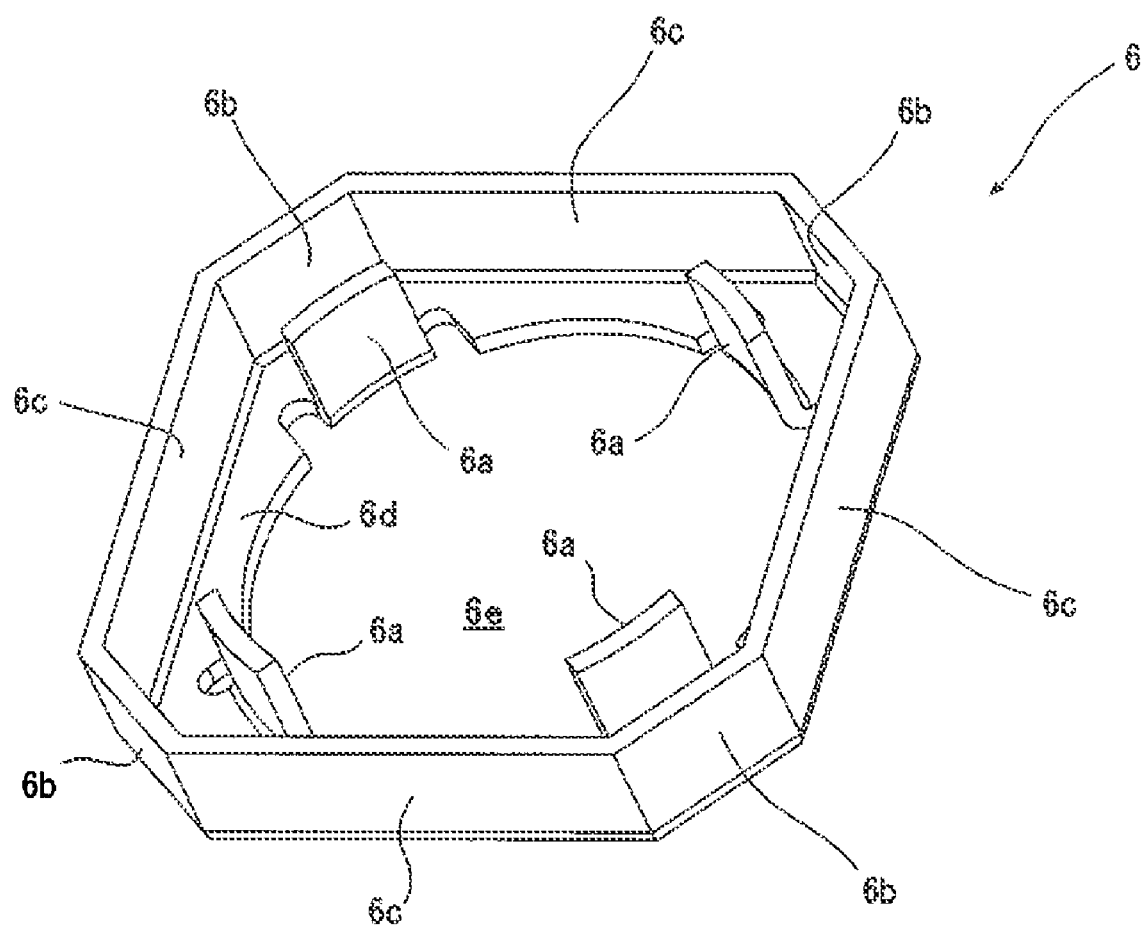
FIG. 2 is a perspective view which shows the yoke 6 of the actuator assembly shown in FIG. 1.

Next, with reference to FIG. 1 and FIG. 2, a detailed description will be made with regard to the yoke 6, the magnets 7a, 7b and the coil 8.

The coil 8 is a moving coil formed by winding a wire so as to have an octagon shape in its horizontal cross section having the eight outside surface portions. The eight outside surface portions of the coil 8 include four large surface portions 8a and four small surface portions 8b which are arranged alternately. The coil 8 which is formed into such an octagon shape is supported on the coil support portions 9a of the holder 9 at the lower edges of the respective large surface portions 8a. Since the holder 9 has a cylindrical shape as described above, and therefore four spaces 8c are formed between the coil 8 and the outer circumferential surface of the holder 9 at locations respectively corresponding to the four small surface portions 8b of the coil 8.

As described above, the yoke 6 has the outer wall portion formed to have the octagon shape in its horizontal cross section which is similar to and larger than the octagon shape of the coil 8. Therefore, the outer wall portion of the yoke 6 includes the eight magnet mounting inner surfaces, and the eight magnet mounting inner surfaces include four small inner surfaces 6b and four large inner surfaces 6c which are arranged alternately. Further, as clearly shown in FIG. 2, four yoke pieces 6a are provided on the inner periphery of the top surface 6d of the yoke 6 which defines the opening 6e so as to protrude downwardly into the spaces 8c between the outer circumferential surface of the holder 9 and the coil 8 described above, respectively.

Further, as described above, the eight flat plate-shaped magnets 7 include four plate-shaped small magnets (first magnets) 7a and four plate-shaped large magnets (second magnets) 7b which are arranged alternately on the corresponding eight magnet mounting inner surfaces of the outer wall portion of the yoke 6. Specifically, the four plate-shaped small magnets 7a are respectively mounted (bonded) on the four small inner surfaces 6b of the outer wall portion of the yoke 6. Further, the four plate-shaped large magnets 7b are respectively mounted (bonded) on the four large inner surfaces 6c of the outer wall portion of the yoke 6. These magnets 7a and 7b are arranged so as to have a predetermined constant spacing with respect to the corresponding outside surface portions 8a, 8b of the coil 8. Namely, in the actuator assembly, the four plate-shaped small magnets (first magnets) 7a are arranged so as to face the four small surface portions 8b of the coil 8 through a predetermined constant spacing, respectively, and the four plate-shaped large magnets (second magnets) 7b are arranged so as to face the four large surface portions 8a of the coil 8 through a predetermined constant spacing, respectively.

According to the camera module of the embodiment provided with the actuator assembly 1 having the structure described above, the eight flat plate-shaped magnets 7a, 7b are arranged so as to surround the entire outer circumference (outside surface portions) of the coil 8 through the predetermined constant spacing. Therefore, it is possible to provide a sufficiently strong magnetic field to the coil 8. As a result, it is possible to displace the holder 9 with sufficient driving force.

Further, in the conventional camera module using a cylindrical coil in combination with flat plate-shaped magnets, there is a problem in that a distance between the circumferential surface of the coil and the surface of each magnet varies depending on positions of the circumferential surface of the coil. However, according to the camera module of the embodiment provided with the actuator assembly I having the structure described above, the distance between the outside surface portions of the coil 8 and the flat plate-shaped magnets (7a, 7b) can be kept constant.

Furthermore, in the camera module of the embodiment provided with the actuator assembly 1 having the structure described above, the four yoke pieces 6a are provided on the inner periphery of the top surface portion 6d of the yoke 6 which defines the opening 6e so as to protrude downwardly into the spaces between the outer circumferential surface of the holder 9 and the coil 8, respectively, and the four yoke pieces 6a are arranged inside the coil at positions respectively corresponding to the four plate-shaped small magnets 7a. As a result, since the coil 8 is placed in a strong magnetic field produced between each of the four plate-shaped small magnets 7a and each of the four yoke pieces 6a at the four locations, it is possible to further enhance the driving force of the holder 9. Further, since the four yoke pieces 6a are positioned in the spaces 8c created between the outer circumferential surface of the holder 9 and the coil 8, respectively, the inside space of the actuator assembly 1 can be used effectively, which contributes to a further reduction in size of the camera module.

Finally, it should be understood that the present invention is not limited to the preferred embodiment described hereinabove and, needless to say, a variety of modifications or variations may be made without departing from the scope of the invention defined in the following claims.

Further, it is also to be understood that the present disclosure relates to a subject matter contained in Japanese Patent Application No. 2007-024540 (filed on Feb. 2, 2007) which is expressly incorporated herein by reference in its entirety.

What is claimed is:

1. A camera module, comprising:
  a lens unit which constitutes an optical system of the camera module;
  a holder which houses the lens unit therein and is displaceable along an optical axis direction of the lens unit, the holder having a cylindrical shape having upper and lower cylindrical end portions;
  a coil provided on the holder, the coil being formed to have an octagon shape in its horizontal cross section having eight outside surface portions;
  a yoke having an outer wall portion formed to have an octagon shape in its horizontal cross section which is similar to and larger than the octagon shape of the coil and having eight magnet mounting inner surfaces, the yoke having a top surface portion formed with an opening for receiving the holder;
  eight flat plate-shaped magnets respectively provided on the magnet mounting inner surfaces of the outer wall portion of the yoke for providing a magnetic field to the coil in cooperation with the yoke, each of the eight flat plate-shaped magnets being arranged so as to face each of the outside surface portions of the coil through a predetermined spacing;
  upper and lower leaf springs respectively attached to upper and lower cylindrical end portions of the holder for supporting the holder so as to be displaceable along the optical axis direction of the lens unit; and
  a base for supporting the yoke and the lower spring,
  wherein the eight outside surface portions of the coil include four small outside surface portions and four large outside surface portions which are arranged alternately, the eight magnet mounting inner surfaces of the outer wall portion of the yoke include four small inner surfaces and four large inner surfaces which are arranged alternately, and the eight flat plate-shaped magnets include four flat plate-shaped small magnets and four flat plate-shaped large magnets which are arranged alternately and respectively mounted on the corresponding magnet mounting inner surfaces of the outer wall portion of the yoke so as to have a predetermined spacing with respect to the corresponding outside surface portions of the coil.

2. The camera module as claimed in claim 1, wherein the coil is provided on the holder so that four spaces are created between the coil and the holder at the locations of the four small outside surface portions of the coil, and the yoke has four yoke pieces which are provided on the inner periphery of the top surface portion of the yoke which defines the opening so as to downwardly protrude into the four spaces, respectively, wherein the four yoke pieces are arranged inside the four spaces so as to face the four flat plate-shaped small magnets through the four small outside surface portions of the coil, respectively.

* * * * *